United States Patent [19]

Barber et al.

[11] Patent Number: 4,500,069
[45] Date of Patent: Feb. 19, 1985

[54] HYDRAULIC DIRECTIONAL CONTROL VALVE

[75] Inventors: Ralph R. Barber, Waxhaw; Eckart F. Schultze, Charlotte, both of N.C.

[73] Assignee: Duff-Norton Co., Charlotte, N.C.

[21] Appl. No.: 346,175

[22] Filed: Feb. 5, 1982

[51] Int. Cl.³ .............................................. F16K 39/00
[52] U.S. Cl. .................................. 251/282; 137/522; 137/539.5; 137/596.2; 137/DIG. 2; 91/452; 91/454
[58] Field of Search ....................... 251/282, 138, 339; 137/DIG. 2, 539.5, 596.17, 879, 881, 596.2, 522; 91/452, 454

[56] References Cited

U.S. PATENT DOCUMENTS

| | | | |
|---|---|---|---|
| 1,875,574 | 9/1932 | Duncan | 137/DIG. 2 |
| 1,964,281 | 6/1934 | Young et al. | 251/138 |
| 2,987,071 | 6/1961 | Haus | 137/539.5 |
| 3,608,859 | 9/1971 | Hetzer | 251/282 |
| 4,011,888 | 3/1977 | Whelchel et al. | 91/452 |

Primary Examiner—Martin P. Schwadron
Assistant Examiner—Sheri Novack
Attorney, Agent, or Firm—Richards, Shefte & Pinckney

[57] ABSTRACT

An improvement in ball-type check valve arrangements including a valve body in which is formed a fluid passageway and a valve chamber communicating through a valve seat in the chamber, a ball in the chamber seated in the valve seat, and a reciprocal retaining member having a head engaging the ball in opposition to the valve seat and a stem extending from the head through the chamber wall opposite the valve seat, the ball and retaining member being reciprocably movable toward and away from the seat. The head includes a circular wall annularly engaging the ball, the stem being of a cross-sectional area smaller than both the area defined by the circular wall and the valve seat opening, providing a net surface area of the ball and retaining member equal to the difference of the valve seat opening area and the cross-sectional stem area against which chamber pressure applies valve closing force toward the seat, whereby reduced valve opening force, as compared to conventional ball valves, is required in opposition to the valve closing force and the ball and retaining member are maintained in contact. A longitudinal bore through the valve stem permits relief of pressurized fluid if any separation of the ball and retaining member occurs whereby chamber pressure cannot act in opposition to its valve closing force on the net surface area.

6 Claims, 5 Drawing Figures

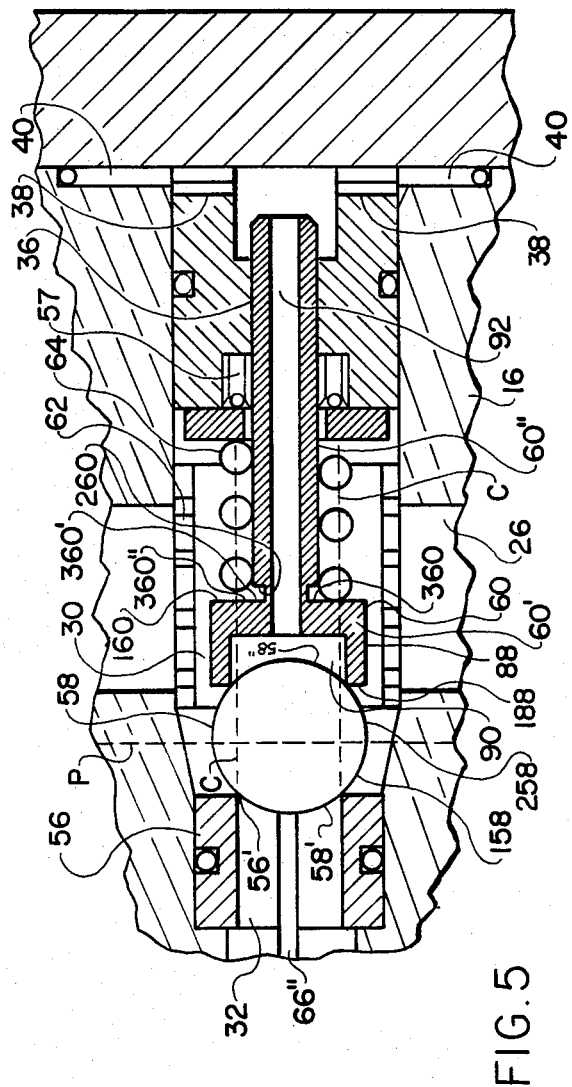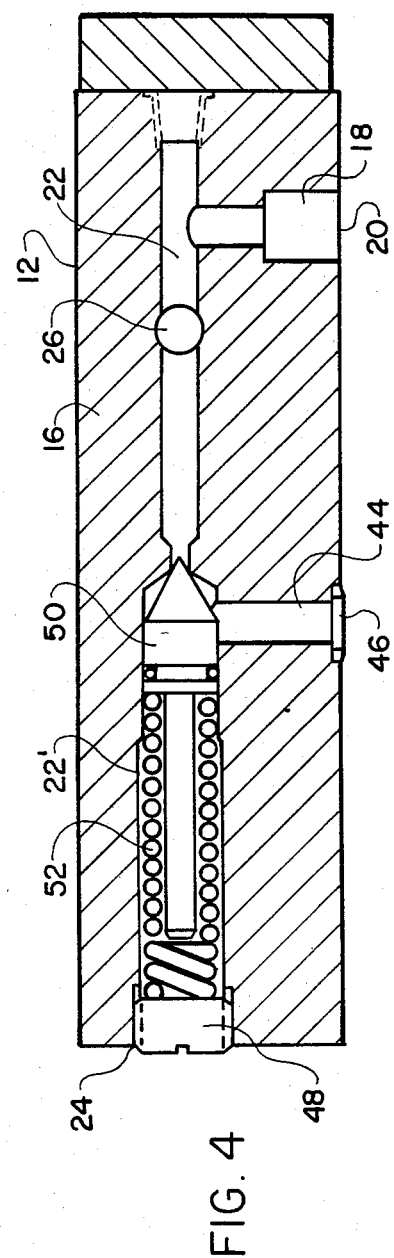

HYDRAULIC DIRECTIONAL CONTROL VALVE

BACKGROUND OF THE INVENTION

The present invention relates to fluid directional control valves and particularly to such valves of the solenoid-operated type.

Solenoid-operated fluid directional control valves have application in a wide variety of hydraulically-operated apparatus. Typically, such valves are employed to control the flow of a supply of non-compressible fluid to and from the hydraulic cylinder of a hydraulic ram and provide for such purpose a fluid inlet port adapted to receive fluid under pressure from an arrangement of a pump and a fluid reservoir, a fluid outlet port adapted to direct the pressurized fluid to the hydraulic ram, and a fluid return port adapted to return the fluid from the ram to the inlet side of the pump. A spring-biased check valve provides fluid communication from the inlet to the outlet port while preventing flow in the reverse direction and a solenoid-operated check valve is arranged between the outlet and the return port to be normally closed by deenergization during operation of the hydraulic ram to prevent fluid flow into the return port and to be opened upon energization against the prevailing fluid pressure on the pump side of the solenoid valve to permit return flow of the fluid in the ram to the return port.

In many control valves of the above-described type, it is an important engineering consideration to maximize its return flow capacity through the solenoid-operated check valve thereof at low pressure drops while minimizing the force required of the solenoid to unseat the check valve against the fluid pressure operating oppositely against the check valve to permit the use of the smallest, least costly conventional solenoid possible for any given valve construction. While ball type check valves are ordinarily considered to provide superior sealing, longer life and fewer repair problems as compared to other conventional types of valves, conventional ball check valves characteristically require a greater unseating force for any given size seat than do other conventional check valve types under corresponding conditions of fluid pressure because of the spherical shape of the ball element whereby the ordinary ball retaining member used in such valves opposite the ball from the valve seat makes only limited, nonsealing contact with the ball whereby substantially the full surface area of the ball not extending into the valve seat is exposed to the fluid pressure against which any opening force must act. As a result, conical poppets have traditionally been used in check valves of the present type to reduce the unseating force required.

Accordingly, it is an object of the present invention to provide an improved ball-type check valve for a hydraulic fluid directional control valve adapted for solenoid operation which requires a substantially smaller unseating force than correspondingly sized conventional ball check valves and are comparable if not superior in such characteristic to conventional conical poppet check valves.

SUMMARY OF THE INVENTION

The present invention provides an improvement in the type of fluid directional control valve having a valve body within which is formed a valve chamber and a fluid passageway, an annular valve seat in one wall surface of the chamber defining a valve seat opening providing fluid communication between the chamber and the passageway, a ball in the chamber adapted for seated engagement in the valve seat to sealably close the valve seat opening, and a ball retaining member disposed in the chamber in engagement with the ball in opposition to the valve seat, the ball retaining member having a head portion engaging the ball and a stem portion extending from the head portion oppositely of the ball through another wall surface of the chamber generally opposite the valve seat to exposure exteriorly of the chamber and the ball retaining member being selectively movable toward and away from the valve seat to engage and disengage the ball in the valve seat. Briefly described, the present invention provides an annular engaging surface on the head portion of the ball retaining member for sealing contact annularly about the ball substantially parallel to the valve seat and provides for particular relative dimensioning of the cross-sectional areas of the valve seat opening and the stem portion of the ball retaining member at the another wall surface of the chamber, and the cross-sectional area defined by the annular engaging surface of the head portion. Specifically, the stem portion of the ball retaining member is dimensioned to have a cross-sectional area taken substantially parallel to the valve seat at the another wall surface through which the stem portion extends less than both the cross-sectional area of the valve seat opening and the cross-sectional area defined by the annular engaging surface of the ball retaining member. In this manner, a reduced net effective surface area of the ball and the retaining member is exposed within the chamber against which chamber pressure may apply valve closing force thereby reducing the force required in opposition to the chamber pressure to open the valve while maintaining the retaining member in sealing contact with the ball to prevent separation thereof.

In the preferred embodiment, the valve seat opening is circular and the ball and retaining member and reciprocally movable in a line perpendicular to the valve seat opening and intersecting the center thereof, the annular engaging surface of the head portion of the ball retaining member being circular and contacting the ball substantially centered about such line of movement and the stem portion of the ball retaining member also being centered about such line. The stem portion is of its above-defined cross-sectional area along substantially the entire length thereof exposed in the chamber and extends sealably in the valve body to communication with a return fluid flow passageway at a generally balanced atmospheric fluid pressure lower than the pressure in the chamber. The annular engaging surface of the head portion of the ball retaining member forms therewithin a recess and the stem portion has formed therein a bore opening to the recess at one end thereof and to the return passageway at the other end thereof. In this manner, any fluid pressure at the location of contact between the annular engaging surface and the ball may be relieved through the bore while permitting the chamber pressure to apply its valve closing force against the net effective surface area of the ball and retaining member to maintain the retaining member in contact with the ball.

A valve operating arrangement is also provided and extends in the valve body for selectively exerting on the ball in the first-mentioned passageway a valve opening force slightly greater than the valve closing force of the chamber pressure to move the ball and the retaining member away from the valve seat.

BRIEF DESCRIPTION OF THE DRAWINGS

FIG. 4 is a vertical sectional view of the valve assembly of FIG. 1 taken along line 4—4 of FIG. 3; and FIG. 5 is an enlarged sectional view of the solenoid actuated ball valve of the valve assembly of FIG. 1 also taken along line 3—3 of FIG. 2.

DESCRIPTION OF THE PREFERRED EMBODIMENT

Figure 1:
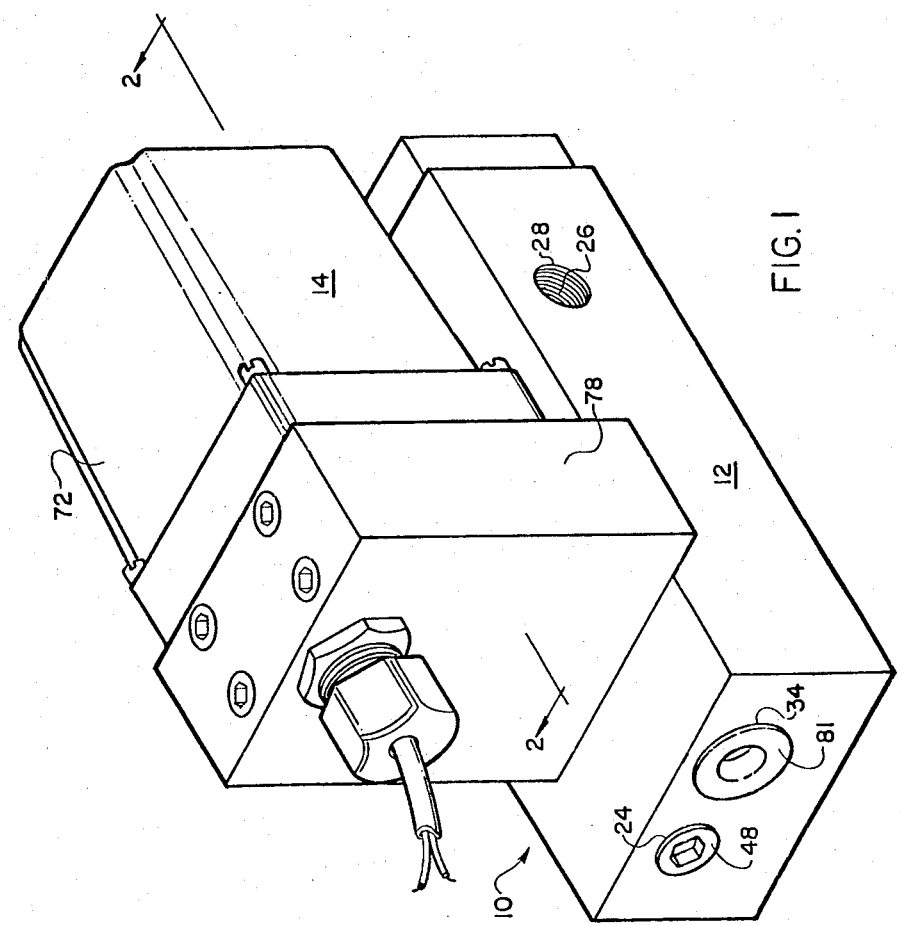
FIG. 1 is a perspective view of the preferred embodiment of the valve assembly of the present invention.

Referring now to the accompanying drawings, the present invention is illustrated and herein described as preferably embodied in a solenoid-operated valve assembly, generally indicated at 10, of the conventional type providing for directional control of the hydraulic flow of fluid under pressure and, as will be understood, the valve assembly 10 will ordinarily be preferably employed in operative association with an arrangement of a hydraulic pump and fluid reservoir (not shown) and a hydraulic ram of the single acting type (also not shown). However, it is to be additionally understood that the present invention resides in the particular ball check valve arrangement incorporated in the valve assembly 10 which will be appreciated by those skilled in the art to have broad utility in a wide variety of other types and kinds of valve assemblies providing for the directional control of pressurized fluid flow. The description and illustration herein of the preferred embodiment of the present invention in the valve assembly 10 is made for the purpose of providing a full and enabling specification and understanding of the present invention and is not to be interpreted as a limitation of the scope thereof which is defined by and is to be determined only from the appended claims.

The valve assembly 10 basically incorporates a valve arrangement 12 and a solenoid arrangement 14 in operative association to be presently explained. As can best be seen in FIGS. 2, 3 and 4, the valve arrangement 12 includes a valve body 16 having a network of substantially cylindrical fluid flow passageways formed therein and opening therefrom for directing the flow of fluid between an appropriate arrangement of a pump and fluid reservoir and the cylinder of a hydraulic ram. The solenoid arrangement 14 selectively controls the path of flow of the fluid through this network of passageways.

The passageway network of the valve arrangement 12 includes a fluid inlet passageway 18 (FIGS. 3 and 4) which opens to the bottom of the valve body 16 at 20 for communicative connection by conventional means to the outlet side of the pump of the aforesaid pump and reservoir arrangement and extends generally vertically through the valve body 16 to communication with a secondary inlet passageway 22 which extends horizontally at a ninety degree orientation to inlet passageway 18 and opens to the left end of the valve body 16 at 24. A primary passageway 26 communicates with the secondary inlet passageway 22 at a short spacing to the left of the inlet passageway 18 and extends horizontally from the secondary inlet passageway 22 at a ninety degree orientation to both the secondary inlet passageway 22 and the inlet passageway 18 and opens at 28 to the front side of the valve body 16 for operative communicative connection to the aforesaid hydraulic ram, the primary passageway 26 communicatively intersecting intermediate its ends an enlarged longitudinal chamber 30 which extends perpendicularly horizontally with respect to the extent of the primary passageway 26. From the leftward end wall of the chamber 30, a secondary fluid return passageway 32 extends in substantially the same horizontal direction as the chamber 30 and opens to the left end of the valve body 16 at 34 and a fluid return passageway 35 communicates with the secondary return passageway 32 a small spacing from the chamber 30 and extends perpendicularly vertically from the secondary passageway 32 and opens to the bottom of the valve body 16 for communicative connection to the reservoir of the aforesaid pump and reservoir arrangement. The rightward end of the chamber 30 communicates with a longitudinal bore 36 which extends horizontally rightwardly from the right end wall of the chamber 30 substantially co-axially with the secondary return passageway 32 and terminates adjacent the right end of the valve body 16 whereat the bore 36 communicates through a pair of transverse ports 38 (FIG. 3) which open to a cavity 40 formed annularly about the bore 36. An auxiliary fluid return passageway 42 communicates with and extends horizontally leftward from the annular cavity 40 to communication with the fluid return passageway 35.

Figure 3:
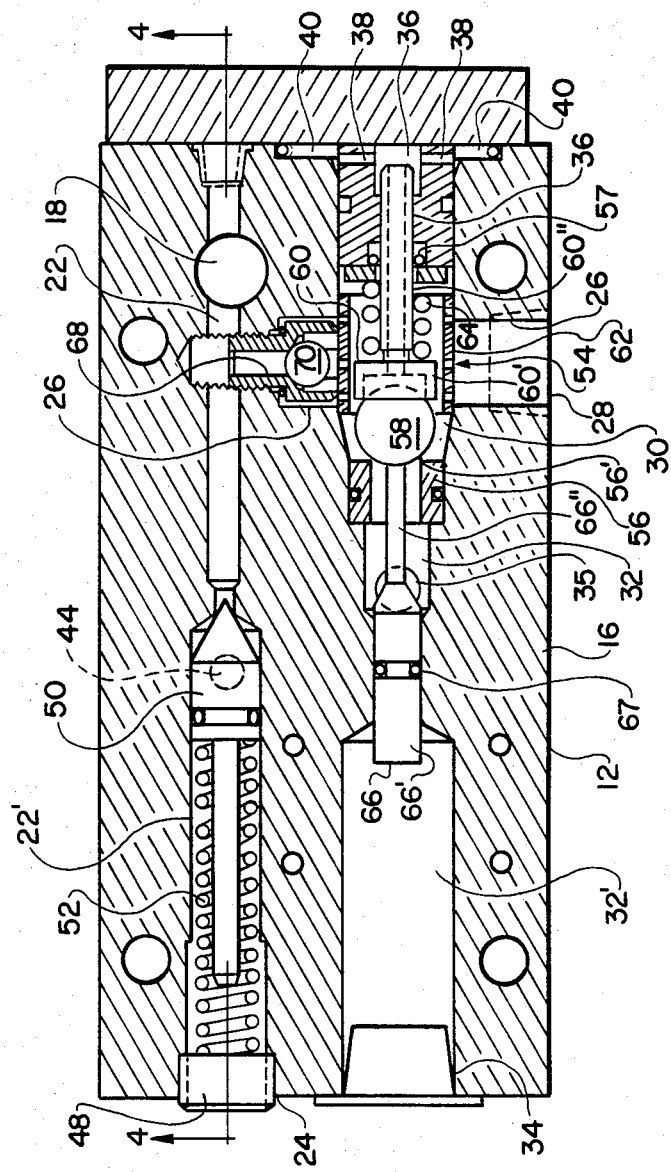
FIG. 3 is a vertical sectional view of the valve assembly of FIG. 1 taken along line 3—3 of FIG. 2.

As will be seen from FIGS. 3 and 4, the secondary inlet passageway 22 is outwardly tapered intermediate the location of its communication with the primary passageway 26 and its opening 24 to the left end of the valve body 16 to an enlarged passageway portion 22' of greater cross-sectional area which extends from the location of the outward taper to the opening 24. Another auxiliary fluid return passageway 44 communicates with the enlarged passageway portion 22' adjacent the outward taper in the passageway 22 and extends vertically downwardly therefrom and opens to the bottom of the valve body 16 at 46 for communicative connection with the pump and reservoir arrangement. The leftward end of the enlarged portion 22' of the secondary inlet passageway 22 at the opening 24 is threaded and receives a compatibly threaded screw 48, a conventional conical poppet valve member 50 being disposed in the enlarged passageway portion 22' and maintained seated in the tapered portion of the passageway 22 by the biasing force of a spring 52 extending between the screw 48 and the valve member 50 to normally close the auxiliary return passageway 44 and the enlarged passageway portion 22' to communication with the remaining extent of the secondary inlet passageway 22. As will be understood, rotational positioning of the screw 48 axially in the enlarged passageway portion 22' permits selective adjusting of the biasing closing force exerted by the spring 48 on the poppet valve member 50.

Disposed in the chamber 30 is a ball check valve arrangement, generally indicated at 54, adapted for opening and closing communication between the primary passageway 26 and the secondary return passageway 32, the ball valve arrangement 54 basically including a circular valve seat 56 formed in the upper end wall of the chamber 30 annularly about the secondary return passageway 32 co-axial therewith, defining a valve seat opening 56' providing fluid communication between the chamber 30 and the secondary return passageway 32, a spherical ball 58 disposed in the chamber 30 adapted for seated engagement in the valve seat 56 to close its opening 56' and a longitudinal ball retaining member 60 disposed in the chamber 30 in engagement with the ball 58 in opposition to the valve seat 56. The ball retaining member 60 includes a head portion 60' adapted and disposed to engage the ball 58 and a cylindrical stem portion 60" which extends longitudinally from the head portion 60' oppositely of the valve seat 56 substantially sealably into and through the bore 36 for sliding reciprocation in the bore 36, the ball 58 and the retaining member 60 being thus adapted for reciprocal movement as a unit toward and away from the valve seat 56 in a line intersecting the center of the valve seat 56 and co-axial with the secondary return passageway 32 to engage and disengage the ball 58 in the valve seat 56. A conventional "U-cup" type sealing ring 57 is disposed in the bore 36 for sealingly engaging the cylindrical periphery of the stem portion 60" to seal the bore 36 from the chamber 30. A cylindrical screen 62 is disposed in the chamber 30 in the path of fluid flow in the primary passageway 26 and annularly about the ball 58 and the ball retaining member 60. A conventional coil spring 64 is disposed about the stem portion 60" of the ball retaining member 60 and extends between the head portion 60' thereof and the bottom wall surface of the chamber 30 to impose slight pressure on the head portion 60' to maintain it against the ball 58 during non-operation of the valve assembly 10, as hereinafter more fully described.

Figure 2:
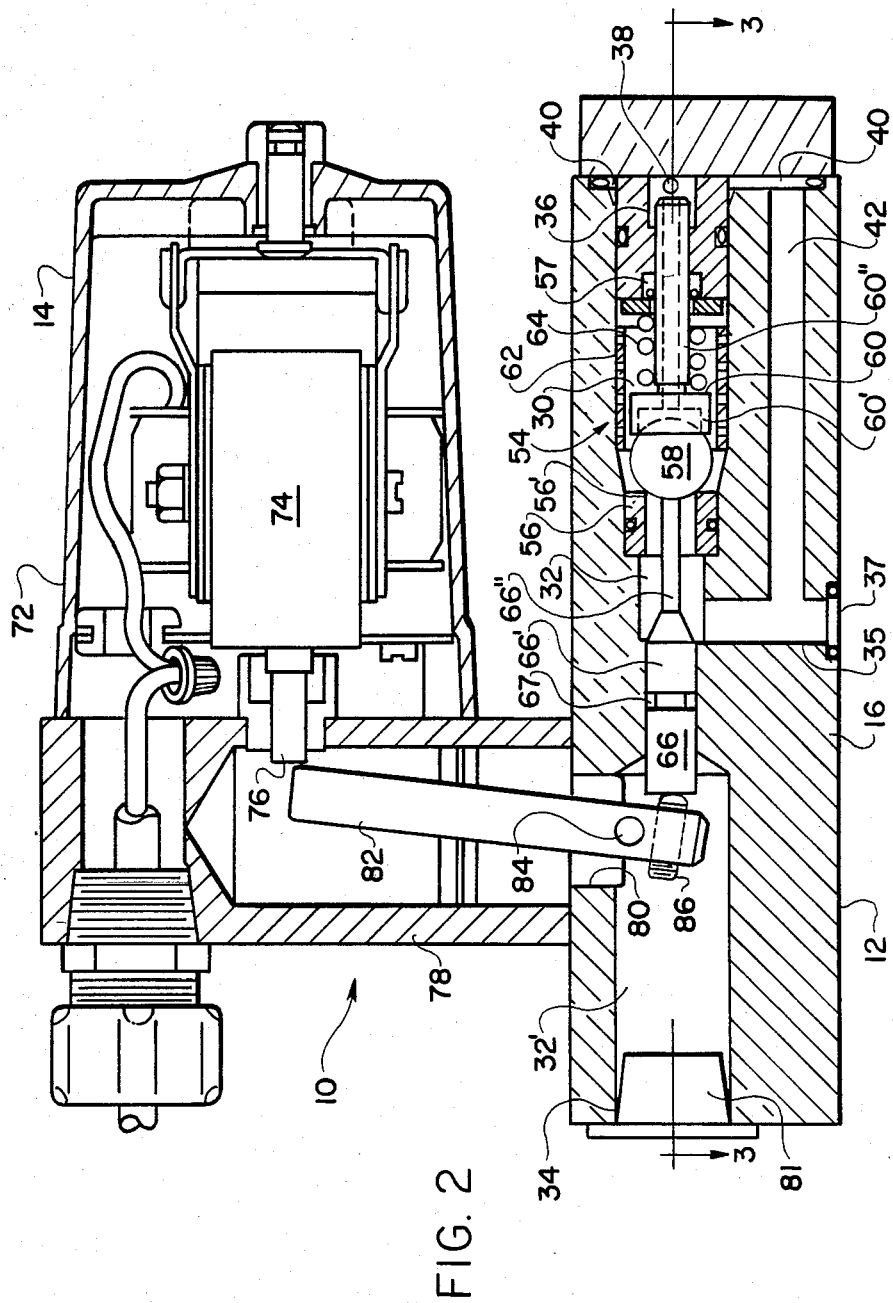
FIG. 2 is a vertical sectional view of the valve assembly of FIG. 1 taken along line 2—2 thereof.

A cylindrical actuating rod 66 is slidably disposed in the secondary return passageway 32 and disposed in contact with the ball 58 for actuating movement of the ball 58 and retaining member 60 away from the valve seat 56. As best seen in FIGS. 2 and 3, the secondary return passageway 32 is outwardly tapered at a spacing leftward of the location of communication between the passsageway 32 and the return passageway 35 to an enlarged passageway portion 32' which extends to the opening 34 at the left end of the valve body 16. The actuating rod 66 includes a primary portion 66' which extends sealably in the passageway 32 between a location immediately to the left of its location of communication with the return passageway 35 and the enlarged passageway portion 32' and prevents, in cooperation with an O-ring seal 67, fluid communication between the portion of the passageway 32 at the chamber 30 and the enlarged passageway portion 32', and includes a ball engaging portion 66" of reduced cross-section which extends from the primary portion 66' into contact with the ball 58.

In the primary passageway 26 generally at the location of its communication with the secondary inlet passageway 22 is threadably mounted a cylindrical inlet valve seat insert 68, a spherical ball 70 being disposed in the passageway 26 between the inlet valve seat 68 and the cylindrical screen 62 for movement in the passageway 26 toward and away from the valve seat 68.

The solenoid arrangement 14 basically includes a substantially hollow housing 72 in which is disposed a conventional solenoid 74 of the type having a linearly displaceable operating rod 76. The leftward portion of the housing 72 is formed as a hollow mounting block 78 which extends transversely downwardly of the remainder of the housing 72 and is adapted to be affixed to the top surface of the valve body 16, the valve body 16 having an opening 80 in its top surface which extends vertically inwardly to communication with the enlarged passageway portion 32' and the mounting block 78 of the solenoid housing 72 being affixed to the valve body 16 about the opening 80. A valve operating lever 82 extends through the valve body opening 80 between the enlarged passageway portion 32' adjacent the left end of the actuating rod 66 and the hollow mounting block 78 adjacent the left end of the operating rod 76 and is pivotably mounted on a pivot pin 84 in the valve body 16 for pivotal movement about a substantially horizontal axis whereby such pivotal movement of the lever 82 may be actuated by the energization of the solenoid 74 to linearly displace leftwardly its operating rod 76 to engage the lever 82 and move it in a counter-clockwise direction and will correspondingly actuate rightward movement of the actuating rod 66 by engagement thereof by the other end of the lever 82. A set screw 86 extends threadably in the end of the lever 82 disposed in the enlarged passageway portion 32' for rotational adjusting movement toward and away from the left end of the actuating rod 66 to permit selective variation of the degree of displacement of the rod 66 upon energization of the solenoid 74. A removable cap 81 in the opening 34 of the passageway portion 32' facilitates access to the set screw 86 for selective adjusting thereof.

The operation of the valve assembly in the control of a linearly reciprocal, single-acting hydraulic ram will thus be understood. Beginning with the ram in its retracted position, the pump of the pump and reservoir arrangement deactuated and the solenoid 74 deenergized, the pump is actuated to direct fluid from the reservoir to flow under pressure generated by the pump into the inlet passageway 18 and therefrom into the secondary inlet passageway 22. The poppet valve arrangement in the left end of the secondary inlet passageway 22 is arranged to normally remain closed against the ordinary forces exerted by fluid pressure in the passageway 22, the spring 52 being of a selected strength adapted to exert a biasing force on the poppet valve 50 greater than the ordinarily prevailing fluid pressure forces for which the valve assembly 10 is adapted to be used but to yield in response to fluid pressure forces exceeding a predetermined value to permit pressurized fluid entering the passageways 18 and 22 to flow into the auxiliary return passageway 44 to be recirculated by the pump, thereby to prevent damage to the valve assembly 10 resulting from excessive fluid pressure. In normal operation, the pressurized fluid flows from the passageway 22 into the primary passageway 26, displaces the ball 70 from the valve seat 68 and, with the solenoid 74 remaining deenergized and the ball 58 accordingly seated in the valve seat 56, flows through the chamber 30 and through the opening 28 to the cylinder of the hydraulic ram to hydraulically cause the ram to reciprocate longitudinally from its retracted position. By deactuation of the pump, the ram can be maintained in its extended position, the force of the pressurized fluid in the cylinder of the ram and in the passageway 26 thereupon acting in the reverse direction through the passageway 26 causing the ball 70 to seat in the inlet valve seat 68 and preventing the return flow of the fluid in the ram into the valve assembly 10. With the pump deactuated, upon energization of the solenoid 74 to effect pivotal movement of the lever 82 and displacement thereby of the actuating rod 66 to move the ball 58 away from the valve seat 56, as hereinabove explained, the pressurized fluid in the ram cylinder and the passageway 26 flows past the ball 58 into the fluid return passageways 32, 35 and therefrom to the reservoir, effecting retraction of the ram.

As will be understood by those skilled in the art, the construction and operation of the valve assembly 10 insofar as such have thus been described hereinabove are generally conventional, the present invention residing in the construction and operation of the ball check valve arrangement 54 to be hereafter described. A typical form of conventional ball check valve used between the chamber 30 and the fluid return passageway 32 would include a spherical ball and a retaining member having a head portion either of a substantially flat ball-engaging configuration whereby essentially only point contact is achieved between the ball and the retaining member or of a configuration providing a ball-centering depression or cavity for non-sealing guiding engagement of the ball, both of which arrangements produces operational disadvantages. The contact obtained in these types of conventional ball check valve arrangements between the ball and its retaining member is very limited and importantly is not sealing contact whereby substantially the entire surface area of the ball axially opposite the valve seat is left exposed in the chamber for unopposed application of valve closing force by the pressurized fluid in the chamber, against which the valve opening force of the solenoid must be exerted to effect return flow of fluid from the hydraulic ram. Because, as previously mentioned, it is important to minimize the valve opening force required of the solenoid, conical poppet valves are often employed instead of the above-described conventional ball check valve construction although such poppet valves are not generally obtainable with the manufacturing quality obtained with ball valves, with resulting inferior sealing capability and a generally shorter useful life.

According to the present invention, the retaining member 60 is of a unique construction and dimensioning relative to the valve environment in which it is employed, the result of which is to effectively reduce the valve opening force required of the solenoid and to maintain the ball 58 and retaining member 60 together as a unit. As may best be seen in FIG. 5, the head portion 60' of the retaining member 60 includes a cylindrical ball-engaging wall 88 centered about the aforesaid line of movement of the ball 58 and retaining member 60 and adapted to annularly sealingly engage the ball 58. The cylindrical stem portion 60" is dimensioned according to the present invention to be of a smaller cross-sectional area taken parallel to the valve seat (i.e. perpendicularly to the line of movement of the ball 58 and retaining member 60), particularly and importantly at the wall surface through which the stem portion 60" extends, than both the cross-sectional area of the valve seat opening 56' and the cross-sectional area parallel to the valve seat 56 defined within the confines of the ball engaging wall 88.

As will be appreciated, it is the respective surface areas of the ball 58 and the retaining member 60 which are exposed in the chamber 30 to fluid pressure therein and which are parallel to the valve seat 56 or otherwise face generally toward or away from the valve seat 56 that are subjected to the forces of prevailing chamber pressure acting in the opposed directions of longitudinal opening and closing movement of the ball 58 and retaining member 60 and accordingly, it is these surface areas which determine the effect of prevailing chamber pressure on the ball 58 and the retaining member 60 in the opening and closing of the ball valve arrangement 54 and in the maintenance thereof closed. In the present construction, the generally opposed surface areas 58', 58" of the ball 58 respectively within the circle of sealing contact with the valve seat 56 and within the circle of sealing contact with the cylindrical wall 88 are shielded from the fluid pressure forces prevailing in the chamber 30, and it is the remaining surface area of the ball 58 which is exposed in the chamber 30 and is to be considered in connection with the effect of chamber pressure on the operation of the valve arrangement 54. Similarly, those surface areas of the retaining member 60 respectively sealed from the chamber 30 within the recess 90 defined by the wall 88 and sealed from the chamber 30 within the bore 36 are not exposed in the chamber 30 to fluid pressure therein, it being the remaining surface areas of the retaining member 60 which are exposed in the chamber 30 and are to be considered in regard to the effect of chamber pressure on the operation of the valve arrangement 54.

With respect to these exposed surface areas and with reference to an imaginary cylindrical extension C of the valve seat opening 56' through the chamber 30 and to an imaginary plane P through the center of the ball 58 taken parallel to the valve seat 56, it will be seen that the present construction effectively creates a net imbalance of the exposed surface areas of the ball 58 and retaining member 60 which generally face toward or away from the valve seat 56, with the total of the exposed surface areas facing toward the valve seat 56 being less than the total of the exposed surface areas facing away from the valve seat 56 by the difference between the cross-sectional area of the valve seat opening 56' and the cross-sectional area of the stem portion 60" taken at the chamber wall surface through which it extends.

Looking first to the exposed surface areas of the ball 58 and the retaining member 60 outwardly of the imaginary cylinder C, it will be seen that such surface areas are balanced in that the total of such surface areas facing toward the valve seat 56 equal the total of such surface areas facing away from the valve seat 56. Specifically, the annular surface area 158 of the ball 58 extending between the plane P and the circle of contact of the ball 58 and the valve seat 56 and the leftwardly facing annular surface area 188 of the cylindrical wall 88 constitute the surface areas of the ball 58 and retaining member 60 outwardly of the cylinder C which face toward the valve seat 56, the annular surface area 258 of the ball 58 extending between the plane P and the circle of contact of the ball 58 and the cylindrical wall 88 and the rightwardly facing annular surface area 160 of the head portion 60' of the retaining member 60 extending radially outwardly of the cylinder C constituting the surface areas of the ball 58 and the retaining member 60 outwardly of the cylinder C which face away from the valve seat 56. As will be understood, the total of the surface areas 158 and 188 equal the total of the surface areas 258 and 160, whereby the effect of the force of prevailing fluid pressure in the chamber 30 acting upon the surface areas 158, 188, 258, 160 will be equal in the directions toward and away from the valve seat 56 tending neither to move the ball 58 and the retaining member 60 toward nor away from the valve seat 56.

On the other hand, looking next to the exposed surface areas within the cylinder C, which constitute only surface areas of the retaining member 60, it will be seen that such surface areas are imbalanced in that the total of such surface areas facing away from the valve seat 56 are greater than the total of such surface areas facing toward the valve seat 56. Specifically, the leftwardly facing annular surface area 260 of the stem portion 60" of the retaining member 60 adjacent the heat portion 60' thereof constitutes the only exposed surface area within the cylinder C which faces toward the valve seat 56 and the rightwardly facing annular surface area 360 of the head portion 60' radially extending between the stem portion 60" and the cylinder C constitutes the only exposed surface area within the cylinder C facing away from the valve seat 56. As will be understood, the surface area 360 includes an annular portion 360' opposed and equivalent to the surface area 260, the surface area 360 thus being greater than the surface area 260 by the difference between the cross-sectional areas of the valve seat opening 56', i.e. the cross-sectional area of the cylinder C, and the cross-sectional area of the stem portion 60" at the rightward chamber wall surface through which it extends, this greater portion of the surface area 360 being designated as 360". Thus, the cross-sectional area of the stem portion 60" of the retaining member 60 at the chamber wall surface through which it extends effectively serves to reduce the net effective exposed surface area of the ball 58 and the retaining member 60 against which fluid pressure in the chamber 30 exerts a valve moving force.

This rightwardly facing surface area 360" of the head portion 60' within the cylinder C but radially outward of the larger cylindrical portion of the stem portion 60" thus constitutes the net effective surface area of the ball 58 and the retaining member 60 against which prevailing chamber pressure can apply a moving force. As will be understood, when the valve assembly 10 is in operation either moving the ram or maintaining it extended, the force of the prevailing fluid pressure in the chamber 30 applies to this net surface area 360" a valve closing force in the direction toward the valve seat 56, producing two important results. First, during such operation of the valve assembly 10, this valve closing force acting on the net surface area 360" is effective to overcome the exertion of any force by the fluid pressure on the retaining member 60 in the opposite direction and thereby to maintain the retaining member 60 in sealing annular contact with the ball 58 to prevent separation thereof without the aid of the spring 64. Secondly, the net surface area 360" is substantially smaller than the cross-sectional area of the valve seat opening 56', which would constitute the net effective surface area of the ball 58 exposed for application thereto of valve closing force in the above-described conventional ball check valve arrangements, and, accordingly, the force required of the solenoid 74 in the present invention in opposition to the valve closing force of chamber pressure to open the valve arrangement 54 for fluid return to the reservoir is significantly reduced from that which would be required if a conventional ball check valve arrangement were employed, thus permitting the use of smaller solenoids that are correspondingly less expensive as well.

As indicated, the arrangement of the present invention to provide the above-described net effective surface area 360" renders unnecessary during operation of the valve arrangement the conventional use of a spring to bias the retaining member 60 into contact with the ball 58. However, when the valve arrangement is not in operation, i.e. no pressurized fluid is contained in the chamber 30, the internal pressure in the chamber 30 will approximately equal the external pressure without the chamber 30, particularly the balanced "atmospheric" or reservoir pressure prevailing in the return passageways 32 and 35 opposite the ball 58 and in the bore 36 opposite the stem portion 60" of the retaining member 60. In such situation, the net effect of the pressure surrounding the ball 58 and retaining member 60 within and without the chamber 30 will be to exert approximately equal forces in the chamber 30 and in the passageway 32 and the bore 36 along the line of movement of the ball 58 and retaining member 60 both toward and away from the valve seat 56. Accordingly, to prevent any undesired separation of the ball 58 and retaining member 60 during non-operation of the valve assembly 10, the aforementioned spring 64 is employed in the chamber 50 about the stem portion 60" of the retaining member 60 and is selectively of a strength capable of exerting on the retaining member 60 a force relatively and insignificantly small in relation to the ordinary forces of fluid pressure which will prevail in the chamber 30 during operation of the valve assembly 10, whereby the spring 64 will have a negligible effect on the above-described ordinary operation of the ball 58 and retaining member 60, the spring 64 being sufficiently strong substantially only to maintain the retaining member 60 in sealing contact with the ball 58 in valve closing assembly under conditions in which no difference in pressure exists within and without the chamber 30, all as is conventional.

Those skilled in the art will appreciate that, with the construction as described up to this point, if through some malfunction or unforseen occurrence the sealing contact between the ball 58 and the retaining member 60 would become sufficiently broken during ordinary operation of the valve assembly 10, the above-described operation of the ball 58 and retaining member 60 would be prevented since such an occurrence would expose the surface area of the head portion 60' in the recess defined within the confines of the cylindrical wall 88 to prevailing chamber pressure which surface area would thereby increase the total surface area of the ball 58 and retaining member 60 facing the valve seat 56 and would not be counterbalanced by an oppositely facing surface area or areas of the ball 58 and retaining member 60 since the opposite end of the retaining member 60 is sealed within the bore 36 and would result in the action of chamber pressure against such recess surface area to cause undesired separation of the retaining member 60 from the ball 58. As a safety feature, therefore, the valve arrangement 54 is provided with an arrangement for relieving from the chamber 30 any pressurized fluid which may penetrate the ordinary sealing contact between the annular wall 88 of the retaining member 60 and the ball 58 and for permitting the prevailing chamber pressure to continue to exert valve closing force against the aforesaid net effective surface area 360" to maintain contact between the ball 58 and the retaining member 60 thereby to permit the continued intended operation of the valve assembly 10. Specifically, the annular wall 88 of the retaining member 60 is constructed to define therewithin a cylindrical recess 90 and the stem portion 60" is provided with a central bore 92 extending longitudinally therethrough the length thereof and opening at the left end thereof to the recess 90 and at the right end thereof to the bore 36. As will be understood, the bore 36 communicates through the transverse ports 38 and the annular cavity 40 with the auxiliary return passageway 42 which communicates with the return passageway 35 and, therefore, the prevailing pressure in bore 36 is ordinarily the balanced "atmospheric" pressure of the reservoir. Accordingly, should the sealing contact between the wall 88 and the ball 58 be broken, any pressurized fluid thereby entering the recess 90 will be relieved to the reservoir through the bore 92, the ports 38, the cavity 40 and the passageways 42 and 35. The relieved fluid is thus prevented from exerting on the wall surfaces of the retaining member recess 90 any fluid pressure force opposite to the fluid pressure valve closing force acting against the net effective surface area of the retaining member 60 and thereby the valve closing force continues to maintain the retaining member 60 in contact against the ball 58 to permit the continuance of the intended manner of operation of the valve assembly 10.

In conclusion, it will be seen that the present invention facilitates the selective provision in a ball valve arrangement of a net effective surface area against which valve closing force may be applied by fluid pressure in the valve arrangement, thereby permitting the selective design control of the valve opening force required in opposition to the chamber pressure. By the construction of the present invention, therefore, ball valve arrangements may be employed and their advantageously superior sealing and wear capabilities realized in valve assemblies for the flow control of pressurized fluids wherein a low valve opening force is desired and heretofore less desirable poppet valve arrangements have normally been used. Through the selective relative dimensioning of the present invention, the disadvantages of ball valve arrangements which have in the past limited the scope of use thereof are eliminated.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. In a ball-type fluid directional control valve comprising a valve body having formed therewithin a valve chamber for receiving pressurized fluid and a fluid exhaust passageway, an annular valve seat in one wall surface of said chamber defining a valve seat opening providing fluid communication between said chamber and said passageway, a ball in said chamber adapted for seated engagement in said valve seat to sealably close said valve seat opening, and a ball retaining member disposed in said chamber in engagement with said ball in opposition to said valve seat, said retaining member having a head portion engaging said ball and a stem portion extending from said head portion oppositely of said ball through another wall surface of said chamber generally opposite said valve seat to exposure exteriorly of said chamber, said ball and said retaining member being selectively movably toward and away from said valve seat to engage and disengage said ball in said valve seat, the improvement comprising the cross-sectional area of said stem portion taken substantially parallel to said valve seat at said another wall surface of said chamber being less than the cross-sectional area of said valve seat opening, said head portion having an annular engaging surface in sealing contact annularly about said ball substantially parallel to said valve seat and defining a cross-sectional area greater than said cross-sectional area of said stem portion at said another wall surface, said stem portion and said head portion cooperating with said valve seat opening to leave exposed to pressurized fluid in said chamber only a reduced net effective surface area of said ball and said retaining member for application thereagainst by said pressurized fluid in said chamber of a relatively slight valve closing force sufficient alone to bias said ball and said retaining member into engagement in said valve seat to reduce the force required in opposition to said pressurized fluid to open said valve while maintaining said retaining member in sealing contact with said ball to prevent separation thereof, said stem portion extending sealably in said valve body to communication with an area exteriorly of said chamber of a fluid pressure lower than said pressurized fluid in said chamber, said annular engaging surface of said head portion forming therewithin a ball receiving recess and said stem portion having formed therein a bore opening to said recess at one end thereof and to said lower pressure area at the other end thereof to relieve any fluid pressure at the location of contact between said annular engaging surface and said ball to permit said pressurized fluid to apply said valve closing force against said net effective surface area to maintain said retaining member in contact with said ball.

2. An improvement in a ball-type fluid directional control valve according to claim 1 and characterized further by valve operating means extending in said valve body for selectively exerting on said ball in said passageway a valve opening force slightly greater than said valve closing force of said chamber pressure to move said ball and said ball retaining member away from said valve seat.

3. An improvement in a ball-type fluid directional control valve according to claim 1 and characterized further in that said lower pressure area is at generally atmospheric pressure.

4. An improvement in a ball-type fluid directional control valve according to claim 1 and characterized further by a fluid reservoir at a generally balanced atmospheric fluid pressure, said valve body having formed therein a return fluid flow passageway normally at said balanced pressure, said stem portion extending sealably in said valve body to communication with said return passageway, to provide a fluid flow path to said return passageway through which fluid pressure may be relieved.

5. A fluid directional control valve for regulating the flow of a fluid under pressure, comprising:
  a. a valve body having formed therein a valve chamber, an inlet fluid flow passageway opening to said chamber for admitting pressurized fluid thereinto, an outlet fluid flow passageway opening to said chamber for exhausting pressurized fluid therefrom, an annular valve seat in said chamber about said outlet passageway defining a circular valve seat opening providing fluid communication between said chamber and said outlet passageway, and a return fluid flow passageway normally at a generally balanced atmospheric fluid pressure;
  b. a fluid reservoir communicating with said return fluid flow passageway and being at said balanced atmospheric pressure; and
  c. ball check valve means disposed in said chamber for selective movement toward and away from said valve seat between a closed position seated in said valve seat opening and an open position spaced from said valve seat for respectively preventing and permitting fluid flow from said inlet passageway to said outlet passageway, said ball check valve means including a substantially spherical ball compatibly dimensioned with said valve seat for seated engagement therein and a ball retaining member disposed in said chamber in engagement with said ball in opposition to said valve seat, said ball and said ball retaining member being reciprocally movable substantially in a line perpendicular to said valve seat opening through the center thereof to engage and disengage said ball in said valve seat in said closed and open position, respectively, said ball retaining member including a head portion having a circular engaging surface in sealing contact about said ball substantially centered about said line of movement of said ball and said retaining member and a longitudinal stem portion extending from said head portion oppositely of said ball substantially centered about said line through another wall surface of said chamber generally opposite said valve seat to exposure exteriorly of said chamber in communication with said return passageway, the cross sectional area of said stem portion perpendicularly of said line being less than the cross-sectional area of said valve seat opening along substantially the entire length of said stem portion exposed in said chamber and the cross-sectional area defined by said circular engaging surface being greater than said cross-sectional area of said stem portion, said stem portion and said head portion cooperating with said valve seat opening to leave exposed to pressurized fluid in said chamber only a slightly greater total surface area of said ball and said retaining member facing toward said valve seat opening than facing away therefrom to provide a reduced net effective exposed surface area of said ball and said retaining member for application thereagainst by said pressurized fluid in said chamber of a relatively slight valve closing force sufficient to bias said ball and said retaining member to said closed position to reduce the force required in opposition to said pressurized fluid to open said valve while maintaining said retaining member in sealing contact with said ball to prevent separation thereof, said circular engaging surface of said head portion forming therewithin a ball receiving recess and said stem portion having forced therein a bore opening to said recess at one end thereof and to said return passageway at the other end thereof to relieve any fluid pressure at the location of contact between said circular engaging surface and said ball to permit said pressurized fluid to apply said valve closing force against said net effective surface area to maintain said retaining member in contact with said ball.

6. A fluid directional control valve according to claim 5 and characterized further by valve operating means extending in said valve body for selectively exerting on said ball in said outlet passageway a valve opening force slightly greater than said valve closing force of said pressurized fluid to move said ball and said ball retaining member away from said valve seat and biasing means operably associated with said ball retaining member and selectively arranged to urge said ball retaining member toward said valve seat by exerting thereon a biasing force relatively small in relation to said valve closing force sufficient substantially only to maintain said retaining member and said ball in valve closing assembly when there is no difference between the pressure within and without said chamber.

* * * * *

UNITED STATES PATENT AND TRADEMARK OFFICE
CERTIFICATE OF CORRECTION

PATENT NO. : 4,500,069
DATED : February 19, 1985
INVENTOR(S) : Ralph R. Barber and Eckart F. Schultze It is certified that error appears in the above-identified patent and that said Letters Patent is hereby corrected as shown below:

Column 2, Line 11, after "ball" add -- and --.
Column 2, Line 40, delete "and" and insert therefor -- are --; (3rd occurrence).
Column 5, Line 37, delete "passsageway" and insert therefor -- passageway --.
Column 9, Line 3, delete "heat" and insert therefor -- head --.
Column 14, Line 9, delete "forced" and insert therefor -- formed --.

Signed and Sealed this

Eleventh Day of February 1986

[SEAL]

Attest:

DONALD J. QUIGG

Attesting Officer

Commissioner of Patents and Trademarks